Figure 1:
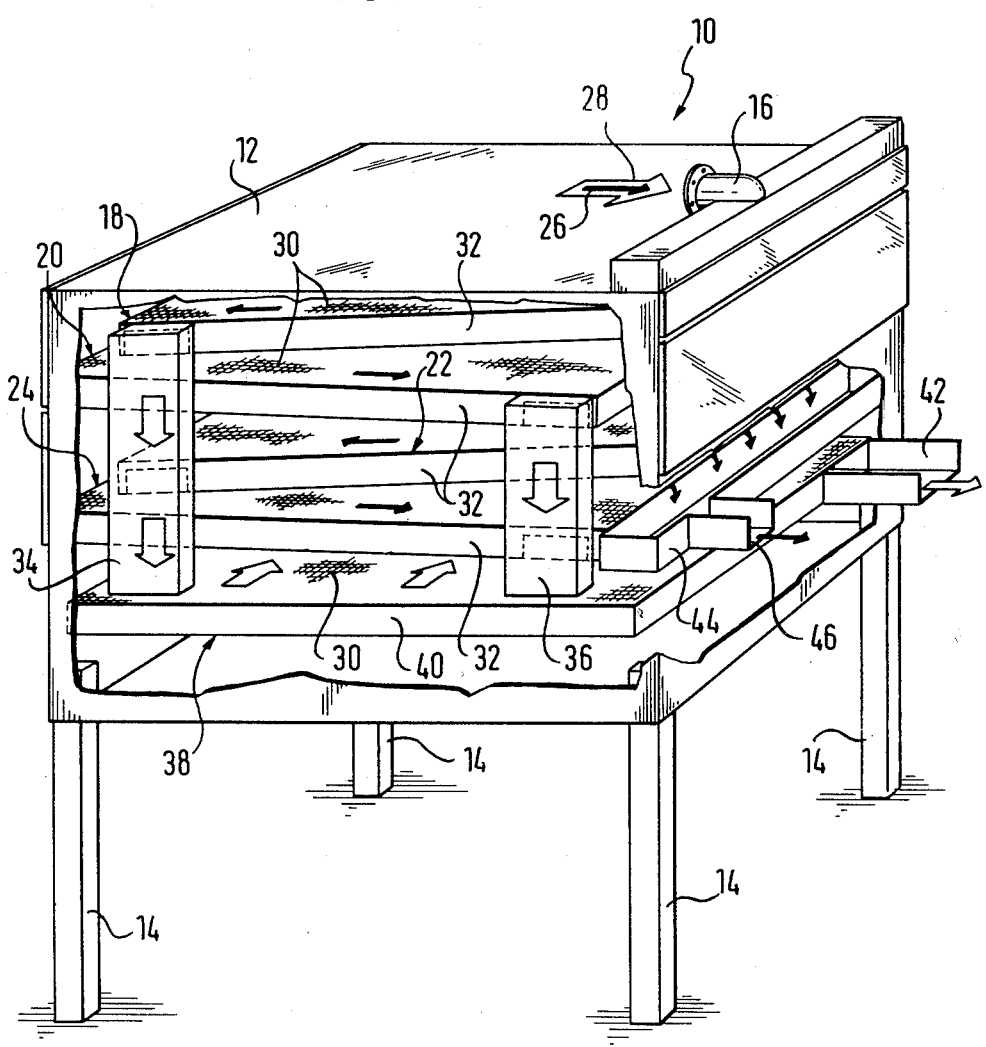

United States Patent [19]

Crema

[11] 4,359,386
[45] Nov. 16, 1982

[54] DEVICE FOR SEPARATING OIL FROM AN OIL-WATER MIXTURE

[76] Inventor: Erhard Crema, Leuchte 96, D-6000 Frankfurt am Main 60, Fed. Rep. of Germany

[21] Appl. No.: 198,002

[22] PCT Filed: Mar. 28, 1980

[86] PCT No.: PCT/DE80/00038

§ 371 Date: Nov. 29, 1980

§ 102(e) Date: Oct. 14, 1980

[87] PCT Pub. No.: WO80/02138

PCT Pub. Date: Oct. 16, 1980

[30] Foreign Application Priority Data

Mar. 29, 1979 [DE] Fed. Rep. of Germany ....... 2912460

[51] Int. Cl.³ .............................................. B01D 23/02
[52] U.S. Cl. .................................................. 210/336
[58] Field of Search ............... 210/310, 314, 335, 336, 210/295, 649, 167, DIG. 5, 255

[56] References Cited

U.S. PATENT DOCUMENTS

| | | | |
|---|---|---|---|
| 1,383,479 | 7/1921 | Nugent | 210/300 |
| 1,536,911 | 5/1925 | Nugent | 210/300 |
| 1,675,378 | 7/1928 | Pearson | 210/300 |
| 2,758,720 | 8/1956 | Van Dijck et al. | 210/295 |
| 3,478,874 | 11/1969 | McLean et al. | 210/314 |
| 3,561,602 | 2/1971 | Molitor | 210/DIG. 335 |
| 3,627,677 | 12/1971 | Dyrud | 210/649 |
| 3,738,492 | 6/1973 | Trillah | 210/DIG. 5 |
| 3,785,970 | 1/1974 | Hodgkins | 210/DIG. 5 |
| 3,948,767 | 4/1976 | Chapman | 210/DIG. 5 |
| 3,954,611 | 5/1976 | Reedy | 210/295 |
| 4,032,444 | 6/1977 | Wright | 210/295 |
| 4,088,578 | 5/1978 | Yoshioka | 210/295 |

*Primary Examiner*—Ivars C. Cintins
*Attorney, Agent, or Firm*—Dennison, Meserole, Pollack & Scheiner

[57] ABSTRACT

In order to separate oil from an oil-water mixture and in order to reduce the level of pollution in the water which is recovered, to prevent environmental pollution, the mixture is conducted over a plurality of inclined planes (18, 20, 22, 24) which are arranged at an acute angle relative to each other, in a housing 12, provided with a fleece 30 which repels oil. Thereby, the water penetrates through the fleece and is fed at the lowest point of one of those planes to a collection device (34, 36, 38, 40, 42) whereas the oil is collected from above the fleece at the lowest point of the bottom most plane 24.

4 Claims, 2 Drawing Figures

U.S. Patent Nov. 16, 1982 Sheet 2 of 2 4,359,386

DEVICE FOR SEPARATING OIL FROM AN OIL-WATER MIXTURE

The invention relates to a device for separating oil from an oil-water mixture, which can be collected in a collecting vessel apart from the circulation system after separation by means of a water jet pump operated by a closed circulation system.

Due to a greater sense of responsibility toward our environment, possibilities of cleaning water polluted for instance with oil, are sought more than ever so that for example in case of damage caused by water in a heating installation, the sewage system is not placed under unnecessary stress, or if a river or a sea is polluted with oil, the biology of the waters is not interfered with.

Devices are known by means of which the greater part of the water mixed with oil can be sucked, e.g. from basements. For this purpose, the oil-water mixture is sucked up, preferably by means of a centrifugal pump, and fed into a tank. Since the oil-water mixture in these devices comes into contact with the rotating parts of the pump, an emulsion is created whereby later separation of the oil from the water is almost impossible. Consequently even if there is only slight oil pollution, great quantities of water must first be transported away from the place of pollution and then be destroyed. With oil pollution on water, a considerable amount of water must be pumped off that cannot be returned to the river or the sea, since the oil cannot be removed from the oil-water mixture, even if there is only a small degree of pollution, which, however, exceeds the admissible maximum.

It is true that devices do exist in which the oil-water mixture does not get into contact with the rotating parts of a pump. Thus, for example, the German Gebrauchmuster U.S. Pat. No. 1,781,835 refers to a water jet pump by means of which an oil-water mixture can easily be sucked off. However, since the sucked up mixture is added to the water circulation system to operate the water jet pump during the sucking operation, this likewise does not offer an open circulation system with the water, e.g., of lakes or rivers, by means by which the water jet pump could be operated.

With a device disclosed in the German patent application No. 27 58 038.7, an oil-water mixture was collected for the first time in a collecting vessel by means of a water jet pump, without the water circulation system for the operation of the water jet pump coming into contact with the polluted water.

Therefore, it is the object of the present invention to separate the oil from an oil-water mixture and to be able to return the cleaned water e.g., to a sewage system or a lake or a river, without risk of pollution of the environment. Thereby the advantage shall be gained that in case of oil pollution, only a small amount of water as compared to the escaped oil must also be destroyed.

One suggestion to solve this problem is realized by a method wherein the oil-water mixture is fed over at least one inclined plane provided with an oil-repellent fleece, in order to recover the separated oil above the plane and the water below the plane. Thus, only the separated oil must be collected in a tank for deposit or destruction. The recovered water can be fed without any difficulty into a sewage system or into open water without running the risk of too great a load on the environment. Preferably, however, the oil-water mixture is not passed over only one inclined plane, but rather over several planes arranged at acute angles to each other and one atop the other. In such a case the different planes can be arranged in a housing and their ends can overlap. This offers the advantage that the oil-water mixture on the separated oil flowing off of a plane will always reach the plane arranged below. The oil and the water separated from the individual planes are respectively fed to separate outlets.

However, the problem can also be solved by pumping the oil off through a water-repellent and oil-permeable fleece arranged in the upper marginal region of the collecting vessel by means of a known barrel pump, e.g. in form of a plunger pump.

This proposal offers the advantages that the oil-water mixture recovered in the collecting vessel need not be fed to a special device but merely that a fleece must be mounted in the upper region of the filled vessel in such a manner that the oil penetrates the fleece and must be sucked off by the pump.

According to the invention, the first mentioned proposal can be realized by a device wherein at least one grooved inclined plane for receiving and discharging the oil-water mixture is provided with a soaking wet, oil-repellent fleece, and that the oil separated from the water and the water can both be fed into separate outlets in the area of the lower end of the inclined plane. Preferably in the device according to the invention, several inclined planes provided with the oil-repellent fleece and running at acute angles to each other are arranged one atop the other in a housing in such a manner that the oil-water mixture and the separated oil flow from one plane to the other; the water penetrating the fleece at the lowest point of each plane can be fed to a collecting system to be discharged through an outlet opening, and at the lowest point of the lowest plane the separated oil can be collected and discharged. According to one embodiment of the invention, the bottom most plane is surrounded by a tank for collecting the water, and has openings within the range of the lowest point and connected to vertical shafts through which the water can be supplied to an inclined bottom filter, of which the angle of inclination is 90° with respect to the planes, and the water, after having penetrated the bottom filter, can be discharged through the openings. If additional oil is separated by the post-filter process, it can preferably be collected in a collecting channel. According to the invention, each plane shall be inclined between 1° and 4° and preferably 2° in relation to the horizontal. The complete housing can be vertically adjusted in order to obtain the desired inclination of the planes or, respectively, of the bottom filter. In order to feed the oil-water mixture in a simple manner and without risk of spilling it from the device according to the invention, the top side of the housing has a sleeve joined on for connection to the collecting vessel.

The alternatively proposed method can be realized by a device wherein the collecting vessel has an inset in its upper marginal region which immerses in the mixture when the collecting vessel is filled, which inset is provided with a water-repellent and oil-permeable fleece on its surface facing the inner surface of the tank, and a suction pipe of a pump for sucking off the oil is arranged at a certain distance from the lowest point of the funnel shaped inset. The inset is preferably provided with a cover which will seal the tank, and in the center of the cover and above the funnel-shaped inset is found the pump, preferably to be operated by hand. The collecting tank itself should be a standard barrel.

The device for the second suggested solution offers the advantages that no expensive additional accessories must be bought in order to effect a separation of the oil from the oil-water mixture. Solely the funnel-shaped inset, preferably in form of a truncated cone section extending into the inside of the tank, is required to suck the oil through the fleece mounted on the surface of the inset facing the inner surface of the tank, and pump it off with the pump. Thereby the hand pump can be arranged in the center of a cover top, on the one hand serving to seal the collecting vessel, and on the other hand tightly connected with the funnel-shaped inset by flanges.

Figure 2:
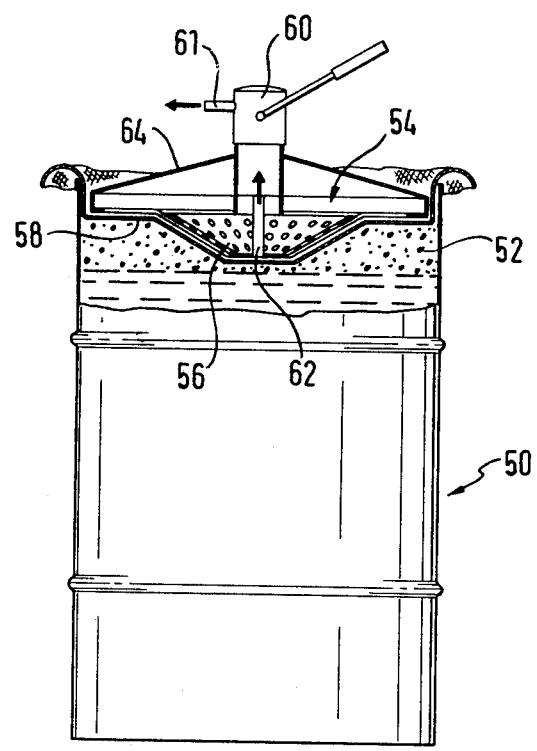

Further details, advantages and characteristics of the invention will be apparent upon consideration of the following description of the attached drawings, wherein:

FIG. 1 is a schematic perspective view of a device for the separation of oil, partly enlarged, and FIG. 2 is another example of embodiment of a device for the separation of oil, likewise partly enlarged view.

FIG. 1 shows a first example of embodiment of a device 10, by means of which the oil in an oil-water mixture can be separated from the water in such a manner that the recovered water can still be used, so that it can be fed back, e.g., into a sewage system or open water without the risk of environmental pollution. The device 10 is composed of a housing 12, supported by four legs 14 which are height adjustable. Water levels (not shown) can be arranged to facilitate adjustment in order to horizontally counterbalance housing 12. On the top of housing 12 is an inlet opening 16, preferably configured in such a manner that it can be connected with a collecting tank via a coupling into which tank the oil-water mixture has been sucked by means of a water jet pump, whereby the water circulation system for the operation of the water jet pump is separated from the collecting tank. Now when the oil-water mixture passes into the housing through inlet opening 16, it flows over the planes 18 to 24 arranged one atop the other and at acute angles to each other. Although the embodiment shows only four planes, the device of course can be fitted with fewer or more planes. The planes 18, 20, 22, 24 overlap in such a manner that the upper region of a lower plane projects above the lower region of an upper plane. Thereby it is guaranteed that the oil-water mixture or the already separated oil coming from one plane can get to the next plane.

However, in order to actually effect a separation, the planes must be covered with a water-permeable and oil-repellent fleece 30. The planes must also have recesses so that the water can penetrate therein. Therefore the plane is preferably configured as a pierced plate. There is a closed box 32 in which the water can be collected found under each plane.

Two shafts 34 and 36 are arranged at the ends of the side walls of planes 18 to 24, describing an angle with respect to each other. Shafts 34 and 36 are also connected to the tanks 32 below the planes, in order to feed the water collected therein to a bottom filter 38, found below planes 18 to 24. Thereby, shafts 34 and 36 each are connected to the lowest points of tank 32, in order to guarantee a perfect discharge of the collected water. Therefore, in the embodiment according to FIG. 1, shaft 34 is connected to the collecting tank of the first plane 18 and the third plane 22, and shaft 36 to collecting tanks 32 of the second plane 20 and the fourth plane 25. The water coming from shafts 34 and 36 is then fed to bottom filter 38, of which the inclination is 90° in relation to the inclinations of planes 18 to 24. Consequently, bottom filter 38, too, is constructed on an inclined plane, over which is spread a water-permeable and oil-repellent fleece. Underneath this fleece, for support, there is found a pierced plate, in order to feed the penetrating water into a collecting tank 40. Collecting tank 40 is then connected to an outlet opening 42, through which the cleaned water can be removed. In the device according to FIG. 1, the oil, separated on planes 18 to 24, flows over all the planes in order to be fed to collecting channel 44 at the lower end of the bottom most plane 24, which is connected to an outlet opening 46. From outlet 46 the oil can then be filled into a transport vessel for deposition or destruction thereof.

In FIG. 1, the course of the water or of the oil is schematically indicated in that the oil is marked by a solid arrow 26 and the water by an outline arrow 28. At the beginning of the separation process, tank filler 16, as mentioned before, is preferably connected with the collecting tank (not shown), so that the mixture can flow over planes 18 to 24 to bottom filter 38. However, prior to feeding the mixture to the device, care must be taken that the water-permeable and oil-repellent fleece is soaked dripping wet. The fleece SH 45 sold by Messers. Enka, Wuppertal, can be used.

While the oil-water mixture is being fed to device 10, water can already penetrate the fleece on the first plane and be collected in collecting tank 32 and fed to shaft 34. If there is a high level of pollution of the water, the fleece of the first inclined plane 18 can soon become clogged. This, however, does not impair the performance of the device, since the next plane 20 fulfills the same task, and therefore it feeds the water to the collecting tank arranged underneath the plane and lets the oil pass over the fleece. In the event that there is still oil in the water to be taken from collecting tanks 32 that is discharged through shafts 34 and 36, then the residual oil is likewise separated by means of bottom filter 38. For this reason, shafts 34 and 36 end in the upper edge of bottom filter 38, which is similarly inclined and constructed like inclined planes 18 to 24, and has an oil-repellent fleece on its surface, and is preferably arranged on a pierced plate, to be able to collect the water in collecting tank 40. Since only a very small portion of the oil can be removed from bottom filter 38, it suffices that a collecting channel for the oil (not shown) is arranged at the lower edge of bottom filter 38. A special continuously operated discharge device is not required. After the oil has passed all the planes 18 to 24, it reaches collecting channel 44 in order to be fed to outlet opening 46 as already described above.

By means of the device shown in FIG. 1, for the first time it is possible to separate the oil from an oil-water mixture with assurance that the cleaned water can be used again. As can be seen, the device used for that purpose is of uncomplicated construction and thus will be of low manufacturing cost. The device 10 is likewise constructed to be portable so that it can be put into action at accident scenes without any difficulties. An optimal separation of the oil takes place if the angle of inclination of each plane 18 to 24 is 2° in relation to the horizontal line. Tests wherein the plane subsequent to another plane had a greater angle of inclination have likewise given completely satisfactory results. Thereby the first plane can have an angle of inclination of 1.8°, the second plane an angle of inclination of 2°, the third one an increased inclination of 0.4°, etc. In further embodiments of the invention, the inclination of the planes could also be individually adjusted in order to achieve an optimal separation of oil.

FIG. 2 is a schematic view of an alternative suggestion for the recovery of oil from an oil-water mixture, so that the cleaned water will show only an admissible degree of pollution.

According to the embodiment of FIG. 2, the oil-water mixture is filled into a collecting tank 50 as already used when sucking up the oil-water mixture by means of the originally-mentioned water jet pump. After collecting tank 50 is filled up with the oil-water mixture, the oil is allowed to settle for a little time, so that there is exclusively oil-water mixture 52 in the upper region, and underneath the water there is a slight degree of pollution.

In order to suck off the oil, indicated by black dots, from the oil-water mixture, an inset 54 is lodged in the marginal region. Inset 54 is funnel-shaped and its cross section preferably has the form of a truncated cone on a base, of which the tapered end 56 extends into tank 50. The surface of inset 54 facing the inner surface of the tank is covered with a water-repellent and oil-permeable fleece. This fleece can be a commercial fleece made by Messrs. Enka, Wuppertal, sold under the designation "SL 45". The respective area of inset 54 is provided with recesses, in order for the oil to penetrate fleece 58. A standard barrel pump 60, such as a hand-operated plunger pump, is mounted above inset 54, suction pipe 62 of said pump being arranged within that portion of inset 54 extending maximally into the tank 50, in order that a sufficient amount of oil can penetrate the fleece. By actuation of pump 60, the oil is pumped off through an outlet opening 61, so that more oil from oil-water mixture 52 of tank 50 can come into the range of suction pipe 62.

Pump 60 is preferably arranged in a lid-like top 64, serving at the same time as a seal for tank 50. Lid-like top 64 can also be connected with inset 54 by flanges.

With the device according to FIG. 2, the advantage is gained that no special fixtures must be transported in order to separate the oil, e.g. from an oil-water mixture. It suffices that lid-like seal 64 with flange-mounted inset 54 is carried along, which obviously does not cause any difficulties, as they are stored together with collecting tank 50 which is to be transported and thus they can be transported together with the tank.

I claim:

1. Apparatus for separating oil from an oil-water mixture utilizing a plurality of water-permeable and oil-repellent fleece members arranged at an inclined angle in a housing for taking up and discharging the oil-water mixture, the improvement comprising, a plurality of perforated inclined planes mounting said fleece means, said inclined planes arranged one over the other in said housing, so that the oil-water mixture or the separated oil introduced above the top plane will flow from one plane to another, a collecting system for collecting the water penetrating each fleece from the lowest point of each plane, an outlet for said water collecting system, and means for collecting and discharging said separated oil at the lowest point of the bottom most plane.

2. Apparatus as defined in claim 1 wherein a tank for collecting water is arranged below each perforated plane, each tank having an opening in the vicinity of its lowest point, and vertically oriented conduits connected to said openings, an after-filter having fleece means thereon in communication with the conduits, said after-filter having an angle of inclination oriented approximately 90° relative to the said planes, the water after penetrating the after filter passing to said outlet.

3. Apparatus as defined in claim 2, and further including a collecting channel for collecting the oil extracted from the after filter.

4. Apparatus as defined in either claim 2 or 3 wherein the inclination of said planes and of the after filter is between 1° and 4° to the horizontal.

* * * * *